United States Patent
Ohata

(10) Patent No.: US 9,247,082 B2
(45) Date of Patent: Jan. 26, 2016

(54) DISPLAY PROCESSING APPARATUS, IMAGE FORMING APPARATUS, DISPLAY PROCESSING SYSTEM OF A REMOTE SCREEN, AND DISPLAY PROCESSING METHOD

(71) Applicant: Konica Minolta, Inc., Tokyo (JP)

(72) Inventor: Tsutomu Ohata, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/135,773

(22) Filed: Dec. 20, 2013

(65) Prior Publication Data

US 2014/0185090 A1 Jul. 3, 2014

(30) Foreign Application Priority Data

Dec. 25, 2012 (JP) .................... 2012-281840

(51) Int. Cl.
*G06F 3/12* (2006.01)
*H04N 1/00* (2006.01)
(Continued)

(52) U.S. Cl.
CPC .......... *H04N 1/00411* (2013.01); *G06F 3/1205* (2013.01); *G06F 3/1256* (2013.01); *G06F 3/1292* (2013.01); *G06F 9/4445* (2013.01); *G06K 15/002* (2013.01); *H04N 1/0035* (2013.01); *H04N 1/00204* (2013.01); *H04N 1/00278* (2013.01); *H04N 1/00307* (2013.01); *G06F 2200/1637* (2013.01); *G06F 2203/04805* (2013.01); *G09G 2340/0407* (2013.01);
(Continued)

(58) Field of Classification Search
None
See application file for complete search history.

(56) References Cited

U.S. PATENT DOCUMENTS

| 8,495,514 B1 * | 7/2013 | Ludolph et al. ............... 715/768 |
| 2002/0176108 A1 * | 11/2002 | Jeon ............................. 358/1.15 |
| 2004/0024743 A1 * | 2/2004 | Kato ................................. 707/1 |

(Continued)

FOREIGN PATENT DOCUMENTS

| JP | 2002-040880 A | 2/2002 |
| JP | 2004005582 A | 1/2004 |

(Continued)

OTHER PUBLICATIONS

Extended European Search Report issued in corresponding European Application No. 13197388.5 dated Apr. 16, 2014 (7 pages).

(Continued)

*Primary Examiner* — Miya J Cato
(74) *Attorney, Agent, or Firm* — Osha Liang LLP

(57) ABSTRACT

A display processing apparatus comprising: a transmission portion for transmitting screen data for operations of the apparatus to a portable terminal apparatus; a receiving portion for receiving operation information indicating an operation by a user on a remote screen from the terminal apparatus and for receiving the operation information and enlargement display information indicating an enlarged display state when a user operation is performed on the screen displayed with some part thereof missing in a state in which the screen is enlarged; a determination portion for determining whether the operation is an operation of displaying a popup portion; and a screen generating portion for adjusting a display position of the popup portion to generate next screen data, so that the popup portion is displayed in an image enlarged state if the operation information and the enlargement display information are received, and the operation is the operation of displaying the popup portion.

23 Claims, 8 Drawing Sheets

(51) Int. Cl.
   *G06F 9/44* (2006.01)
   *G06K 15/00* (2006.01)

(52) U.S. Cl.
   CPC *H04N2201/0094* (2013.01); *H04N 2201/3273* (2013.01)

(56) References Cited

U.S. PATENT DOCUMENTS

| | | | |
|---|---|---|---|
| 2004/0141066 A1* | 7/2004 | Ohmori et al. | 348/211.2 |
| 2006/0044601 A1 | 3/2006 | Misawa et al. | |
| 2006/0184614 A1* | 8/2006 | Baratto et al. | 709/203 |
| 2007/0198845 A1 | 8/2007 | Morikawa | |
| 2009/0061841 A1* | 3/2009 | Chaudhri | H04M 1/72527 455/420 |
| 2009/0158152 A1 | 6/2009 | Kodimer et al. | |
| 2010/0268762 A1* | 10/2010 | Pahlavan et al. | 709/203 |
| 2014/0068502 A1 | 3/2014 | Tomiyasu et al. | |

FOREIGN PATENT DOCUMENTS

| | | |
|---|---|---|
| JP | 2005-100199 A | 4/2005 |
| JP | 2006039469 A | 2/2006 |
| JP | 2006-067116 A | 3/2006 |
| JP | 2007-251919 A | 9/2007 |
| JP | 2008-276693 A | 11/2008 |
| JP | 2010-026629 A | 2/2010 |
| JP | 2010-033211 A | 2/2010 |
| JP | 2010-108190 A | 5/2010 |
| JP | 2010244189 A | 10/2010 |
| JP | 2012-138866 A | 7/2012 |
| JP | 2014-048735 A | 3/2014 |

OTHER PUBLICATIONS

Notification of Allowance issued in corresponding Japanese Application No. 2012-281840 mailed Jan. 13, 2015 (6 pages).

* cited by examiner

DISPLAY PROCESSING APPARATUS, IMAGE FORMING APPARATUS, DISPLAY PROCESSING SYSTEM OF A REMOTE SCREEN, AND DISPLAY PROCESSING METHOD

This application claims priority under 35 U.S.C. §119 to Japanese Patent Application No. 2012-281840 filed on Dec. 25, 2012, the entire disclosure of which is incorporated herein by reference in its entirety.

BACKGROUND OF THE INVENTION

1. Field of the Invention

The present invention relates to a display processing apparatus with which a portable terminal apparatus such as a smartphone or a tablet computer terminal is connectable via wireless communications, an image forming apparatus such as a multi-function peripheral (MFP), i.e., a multifunctional digital machine, including the display processing apparatus; a display processing system of a remote screen and a display processing method of a remote screen.

2. Description of the Related Art

The following description sets forth the inventor's knowledge of related art and problems therein and should not be construed as an admission of knowledge in the prior art.

In recent years, users can store digital documents on their portable terminal apparatuses such as smartphones and tablet computer terminals, and even view and edit the stored documents anytime and anywhere they like. After editing a document by the portable terminal apparatus, users can transmit the document to an image processing apparatus such as a MFP to have it printed out by or stored on the image processing apparatus. Users also can create a file consisting of image data, for example, by scanning a physical paper document with a scanner of the image processing apparatus, transmit it to their portable information apparatuses to edit the file thereby.

However, users are bothered by operation different screens from the image processing apparatus and the portable information apparatus, back and forth separately, which is quite troublesome.

To solve this problem, there has only recently been proposed a cooperative system including an image processing apparatus and a portable terminal apparatus, which allows a user to access functions of the image processing apparatus from the portable terminal apparatus, by displaying an operation screen of the image processing apparatus to operate the image processing apparatus, as a remote screen on a display portion of the portable terminal apparatus. In such a cooperative system, a portable terminal apparatus displays operation screens of an image processing apparatus as remote screens on its display portion on the basis of screen data received from the image processing apparatus.

That is, information which indicates a user operation is transmitted from a portable terminal to an image processing apparatus, and the image processing apparatus generates next screen data on the basis of received information to transmit generated screen data to the portable terminal. The portable terminal displays updated remote screen based on received screen data.

The touch panel is provided on the portable terminal. A user can scale an image by performing a gesture operation such as a pinch-in operation or a pinch-out operation on a display screen. In other words, the user can enlarge the image of the remote screen displayed on a display of the portable terminal by user's enlarged operation.

The following problem may occur, if an operation performed by the user on the remote screen when the image of the remote screen is displayed in an enlarged state on the portable terminal apparatus is an operation of displaying a popup portion composed of another window.

Specifically, if the user performs an operation of displaying a popup portion on a remote screen when the image of the remote screen is displayed in an enlarged state on the portable terminal apparatus, operation information is transferred from the portable terminal apparatus to the image forming apparatus, and the image forming apparatus generates next screen data including the popup portion corresponding to the operation information.

However, the arrangement position of the popup portion in the screen is set to a position suitable for display on a display panel of the image forming apparatus. Therefore, if a next screen is enlarged and displayed in the display portion while keeping the position of the popup portion, a part or the entirety of the popup portion may be out of the screen. In this case, the user of the portable terminal apparatus needs to locate the popup portion on the screen by scrolling the screen or dragging the popup portion, which is a cumbersome operation.

In addition, if the entirety of the popup portion is out of the display area, the user may not visually recognize even the presence of the popup portion.

Japanese Unexamined Patent Publication No. 2006-039469 discloses a display apparatus configured such that an image to be operated is not hidden even if an operation setting button overlaps the image to be operated.

Further, Japanese Unexamined Patent Publication No. 2010-244189 discloses a technology of optimally arranging a plurality of windows on one screen without overlapping.

Furthermore, Japanese Unexamined Patent Publication No. 2004-005582 discloses a technology of controlling not to transfer, to a slave computer, image information in an area which is not displayed on a master computer, if the display sizes of the master computer and the slave computer are different from each other.

However, the technologies disclosed in Japanese Unexamined Patent Publication No. 2006-039469, No. 2010-244189, and No. 2004-005582 failed to solve the aforementioned problem in the case where a user operation of displaying a popup portion is performed in a state that an image of a remote screen is displayed in an enlarged state on the portable terminal apparatus.

In view of the above, an object of the invention is to provide a display processing apparatus and an image forming apparatus that enable to definitely display a popup portion in a display area of a next screen to be displayed in a display portion of a portable terminal apparatus when a user operation of displaying the popup portion is performed in a state that an image of a remote screen is displayed in an enlarged state on the portable terminal apparatus. Another object of the invention is to provide a display processing system of a remote screen and a display processing method of a remote screen.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a display processing apparatus comprising:

a connection portion connectable to a portable terminal apparatus;

a transmission portion for transmitting screen data for operations of the display processing apparatus to the portable terminal apparatus connected by the connection portion;

a receiving portion for receiving operation information indicating an operation performed by a user on a remote screen from the portable terminal apparatus displaying in a display portion the remote screen of the display processing apparatus based on the screen data and for receiving from the portable terminal apparatus the operation information and enlargement display information indicating an enlarged display state when a user operation is performed on the remote screen displayed with some part thereof missing in a state in which the screen is enlarged;

a determination portion for determining whether the operation indicated by the operation information received by the receiving portion is an operation of displaying a popup portion; and a screen generating portion for not only generating next screen data corresponding to the operation information received by the receiving portion, but also adjusting a display position of the popup portion to generate next screen data, so that the popup portion is displayed in the display portion of the portable terminal apparatus in an image enlarged state based on the enlargement display information if the receiving portion receives the operation information and the enlargement display information and if the determination portion determines that the operation indicated by the operation information is the operation of displaying the popup portion, and wherein the transmission portion transmits the next screen data generated by the screen generating portion to the portable terminal apparatus.

A second aspect of the present invention relates to a display processing system of a remote screen comprising a display processing apparatus and a portable terminal apparatus which can be mutually connected, wherein the display processing apparatus comprises:

a connection portion connectable to the portable terminal apparatus;

a transmission portion for transmitting screen data for operations of the display processing apparatus to the portable terminal apparatus connected by the connection portion;

a receiving portion for receiving operation information indicating an operation performed by a user on a remote screen from the portable terminal apparatus displaying in a display portion the remote screen of the display processing apparatus based on the screen data and for receiving from the portable terminal apparatus the operation information and enlargement display information indicating an enlarged display state when a user operation is performed on the remote screen displayed with some part thereof missing in a state in which the screen is enlarged;

a determination portion for determining whether the operation indicated by the operation information received by the receiving portion is an operation of displaying a popup portion; and a screen generating portion for not only generating next screen data corresponding to the operation information received by the receiving portion, but also adjusting a display position of the popup portion to generate next screen data, so that the popup portion is displayed in the display portion of the portable terminal apparatus in an image enlarged state based on enlargement display information if the receiving portion receives the operation information and the enlargement display information and if the determination portion determines that the operation indicated by the operation information is the operation of displaying the popup portion, and wherein the transmission portion transmits the next screen data generated by the screen generating portion to the portable terminal apparatus, wherein the portable terminal apparatus comprises:

a receiving portion for receiving screen data transmitted from the display processing apparatus;

a display portion for displaying the remote screen of the display processing apparatus based on the screen data; and a transmission portion for transmitting operation information to the display processing apparatus when the user performs an operation on the remote screen, and for transmitting to the display processing apparatus the operation information and enlargement display information indicating an enlarged display state when a user operation is performed on the remote screen in a state in which the screen is enlarged.

A third aspect of the present invention relates to a display processing method of a remote screen to be performed in a display processing apparatus connected to a portable terminal apparatus by a connection portion, the display processing method of the remote screen comprising:

transmitting screen data for operations of the display processing apparatus to the portable terminal apparatus;

receiving operation information indicating an operation performed by a user on the remote screen from the portable terminal apparatus displaying in a display portion the remote screen of the display processing apparatus based on the screen data and receiving from the portable terminal apparatus the operation information and enlargement display information indicating an enlarged display state when a user operation is performed on the remote screen displayed with some part thereof missing in a state in which the screen is enlarged;

determining whether the operation indicated by the operation information received in the receiving is an operation of displaying a popup portion; and generating next screen data corresponding to the operation information received in the receiving, and adjusting a display position of the popup portion to generate next screen data, so that the popup portion is displayed in the display portion of the portable terminal apparatus in an image enlarged state based on the enlargement display information if the operation information and the enlargement display information are received in the receiving and if it is determined in the determining that the operation indicated by the operation information is the operation of displaying the popup portion, and wherein in the transmitting, the next screen data generated in the generating is transmitted to the portable terminal apparatus.

A fourth aspect of the present invention relates to a display processing method of a remote screen to be performed in a display processing system of the remote screen comprising a display processing apparatus and a portable terminal apparatus which can be mutually connected, wherein the display processing apparatus performs:

transmitting screen data for operations of the display processing apparatus to the portable terminal apparatus;

receiving operation information indicating an operation performed by a user on the remote screen from the portable terminal apparatus displaying in a display portion the remote screen of the display processing apparatus based on the screen data and receiving from the portable terminal apparatus the operation information and enlargement display information indicating an enlarged display state when a user operation is performed on the remote screen displayed with some part thereof missing in a state in which the screen is enlarged;

determining whether the operation indicated by the operation information received in the receiving is an operation of displaying a popup portion; and generating next screen data corresponding to the operation information received in the receiving, and adjusting a display position of the popup portion to generate next screen data, so that the popup portion is displayed in the display portion of the portable terminal apparatus in an image enlarged state based on the enlargement display information if the operation information and the enlargement display information are received in the receiving and if it is determined in the determining that the operation indicated by the operation information is the operation of displaying the popup portion, and wherein in the transmitting, the next screen data generated in the generating is transmitted to the portable terminal apparatus, and the portable terminal apparatus performs:

receiving screen data transmitted from the display processing apparatus;

displaying the remote screen of the display processing apparatus based on the screen data; and transmitting operation information to the display processing apparatus when the user performs an operation on the remote screen, and transmitting to the display processing apparatus the operation information and enlargement display information indicating an enlarged display state when a user operation is performed on the remote screen in a state in which the screen is enlarged.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
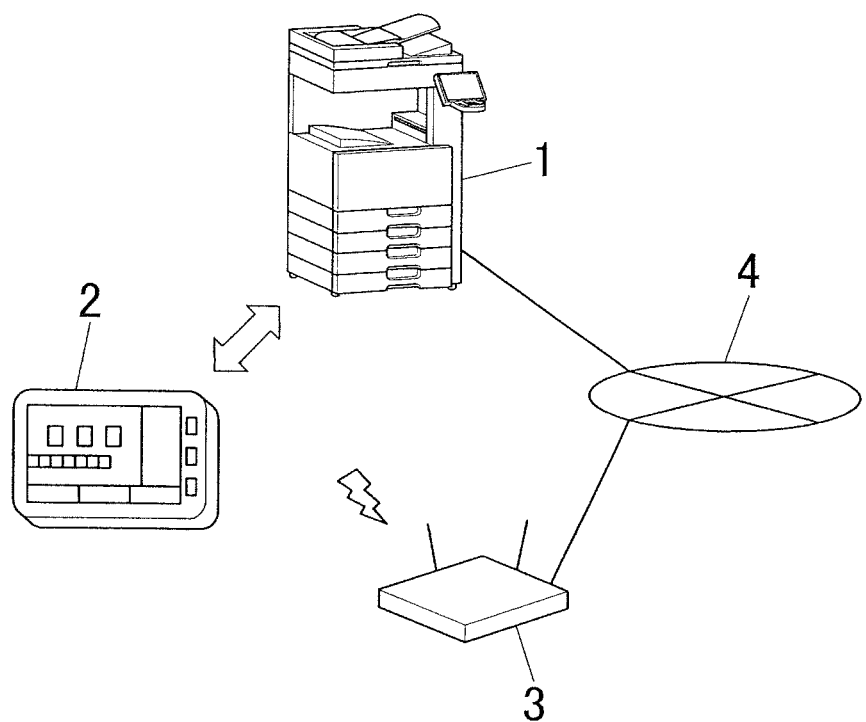
FIG. 1 illustrates a configuration of a display processing system of a remote screen according to one embodiment of the present invention.

FIG. 1 illustrates a configuration of a display processing system with an image forming apparatus according to one embodiment of the present invention.

The display processing system is provided with an image forming apparatus 1 as a display processing apparatus and a portable terminal apparatus 2 such as a smartphone or a tablet computer terminal; the image forming apparatus 1 and the portable terminal apparatus 2 are mutually connected via a wireless LAN router 3 and a network 4 such that they are capable of accessing each other. Alternatively the image forming apparatus 1 and the portable terminal apparatus 2 may be mutually connected via an USB interface or the like, in a wired manner. In this embodiment, the image forming apparatus 1 and the portable terminal apparatus are mutually connected via wireless communications.

In this embodiment, a MFP having various functions such as a copier, printer, scanner, and facsimile function, as described above, is employed as the image forming apparatus 1. Hereinafter, the image forming apparatus 1 will also be referred to as MFP 1. The portable terminal apparatus 2 will also be referred to as portable terminal 2.

Figure 2:
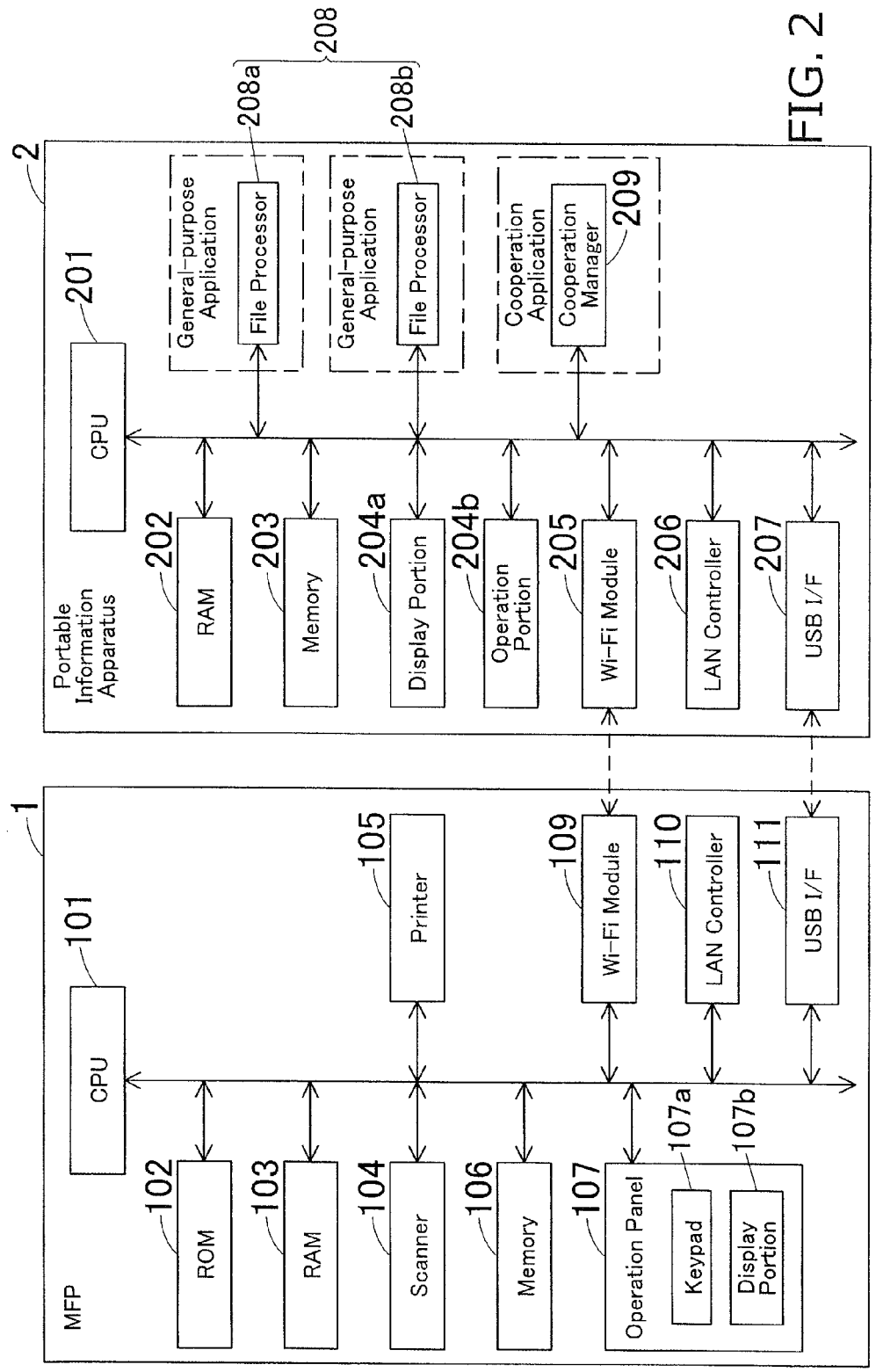
FIG. 2 is a block diagram illustrating an electrical configuration of an image processing apparatus and a portable terminal apparatus.

FIG. 2 is a block diagram illustrating an electrical configuration of the MFP 1 and the portable terminal 2.

The MFP 1 is provided with: a CPU 101, a ROM 102, a RAM 103, a scanner 104, a printer 105, a memory 106, an operation panel 107, a wireless fidelity module (Wi-Fi module) 109, a local area network controller (LAN controller) 110, an USB interface (USB I/F) 111, and the like.

The CPU 101 controls the entire MFP 1 in a unified and systematic manner in accordance with operation programs stored on a memory such as the ROM 102. Specifically, in this embodiment, in addition to enabling various functions of the MFP 1, the CPU 101 creates and transmits to the portable terminal 2 screen data indicating an operation screen of the MFP 1 to be displayed on the portable terminal 2, based on a request from the portable terminal 2, and generates and transmits to the portable terminal 2 next screen data corresponding to operation information transmitted from the portable terminal 2. The CPU 101 also determines whether an operation indicated by the operation information is an operation of displaying a popup portion, and executes processing of generating and transmitting to the portable terminal 2 next screen data including a popup portion if the operation is determined to be an operation of displaying a popup portion. These points will be described later.

The ROM 102 is a memory that stores operation programs for the CPU 101; the RAM 103 is a memory that provides a work area for the CPU 101 to perform processing in accordance with operation programs.

The scanner 104 reads out images from a document put on a platen glass or in an automatic document feeder not shown in the figure and outputs image data that is electronic data.

The printer 105 prints on sheets of paper, image data obtained by scanning a document with the scanner 104 and print data received from the portable terminal 2 or the like.

The memory 106, which consists of a hard disk device, stores various types of data, applications, and the like. Specifically, in this embodiment, the memory 106 stores data (screen data) for reproducing various operation screens of the MFP 1; the CPU 101 reads screen data for an appropriate operation screen for the user operation, out of the memory 106, displays the screen on the operation panel 107 and transmits the screen data to the portable terminal 2. The memory 106 further stores various and a plurality of files such as document files consisting of images obtained by the scanner 104 and document files received from the external devices.

The operation panel 107 allows users to operate the MFP 1 while displaying messages and other information thereon. The operation panel 107 is provided with: a keypad 107a having a Start key, numeric and other keys; and a display portion 107b that consists of a liquid-crystal display, for example, with touch-panel functionality.

The Wi-Fi module 109 is an interface for wireless connection to the portable terminal 2; the LAN controller 110 controls the communication with external apparatuses such as personal computers and other MFPs.

The USB interface 111 is an interface for physical connection to the portable terminal 2.

Meanwhile, the portable terminal 2 consists of a smartphone, a tablet computer terminal, electronic paper, and the like. The portable terminal 2 is provided with: a CPU 201; a RAM 202; a memory 203; a display portion 204a; an operation portion; a Wi-Fi module 205; a LAN controller 206; an USB interface 207; file processors 208a and 208b; a cooperation manager 209; and the like.

The CPU 201 controls the entire portable terminal 2 in a unified and systematic manner in accordance with an operation system (OS), which is basic software, and general-purpose applications.

The RAM 202 is a memory that provides a work area for the CPU 201 to perform processing in accordance with operation programs.

The memory 203, which consists of a hard disk device, stores various types of data, applications, and the like. Specifically, in this embodiment, the memory 203 stores screen data received from the MFP 1, programs such as a basic OS, a cooperation application, and general-purpose applications. Hereinafter, applications also will be referred to simply as "app".

The display portion 204a consists of a liquid-crystal display for example, and the operation portion 204b consists of a touch-panel functionality that accepts the touch operation, provided on the display portion 204a. Usually touch operation is performed via the gesture operation that defines operation content in accordance with the number of fingers touching the screen or moving of fingers. Some examples of the gesture operation, there are a pinch-in operation, a pinch-out operation and the like for instruction of editorial processing of screen data such as scaling (enlargement or reduction) or rotating.

The Wi-Fi module 205 is an interface for wireless connection between the MFP 1 and the portable terminal 2; the LAN controller 206 controls the communication with external apparatuses such as user terminals. The USB interface 207 is an interface for physical connection between the MFP 1 and the portable terminal 2.

The file processors 208a and 208b perform processing on files. Specifically, the file processors 208a and 208b edit files, transfers files, and transmits files by electronic mail. Hereinafter, a file processor 208 will be described as a representative of both the file processors 208a and 208b.

The cooperation manager 209 facilitates access to the functions of the MFP 1 by achieving smooth cooperation between the MFP 1 and the portable terminal 2. Specifically, in order to allow users to access copier, printer, scanner, facsimile and other functions of the MFP 1, the cooperation manager 209 receives screen data from the MFP 1 and displays on the display portion 204a, a screen that looks identical with a screen on the operation panel 107 of the MFP 1, as a remote screen. Furthermore when a user touches on the remote screen on the display portion 204a, the cooperation manager 209 detects the coordinate of a touch position of the remote screen (touch panel) via the operation portion 204b and transmits it as operation information indicating the user operation to the MFP 1. By analyzing the coordinate of the touch position, the MFP 1 recognizes what the user instruction is and performs processing accordingly.

Further, it is not always the case that the display portion 204a displays the entirety (all the areas) of a remote screen based on screen data received from the MFP 1. There is a case that some part of a remote screen is missing if an image of the remote screen is enlarged and displayed in response to a gesture operation. The MFP 1 needs to know whether all of transmitted screen data is displayed, or a screen is displayed in a state that some part of the remote screen is missing. The MFP 1 requests the portable terminal 2 to transmit "information indicating a display state of the remote screen".

In response to a request from the MFP 1, the cooperation manager 209 transmits to the MFP 1 "information indicating a display state of the remote screen", which is displayed on the display portion 204a. An example of "information indicating a display state of the remote screen" is information relating to a screen size (the number of pixels to be displayed in width and height) of a display area of the display portion 204a, a display position relative to the display area of a remote screen, and an enlargement factor (enlargement/reduction factor, determination as to whether the aspect ratio is fixed).

By the way, the file processor 208 is enabled to execute its functions when the CPU 201 activates a general-purpose application. The general-purpose application is software to enable the file processor 208 to perform processing on files. There are various types of general-purpose application: some of them have the function of transmitting files by electronic mail and others have the function of storing files on a Web server, for example.

The cooperation manager 209 is enabled to execute its functions when the CPU 201 activates a cooperation application. The cooperation application is software to achieve smooth cooperation between the MFP 1 and the portable terminal 2. Each general-purpose application and the cooperation application are allowed to mutually exchange files and download files from each other.

Figure 3:
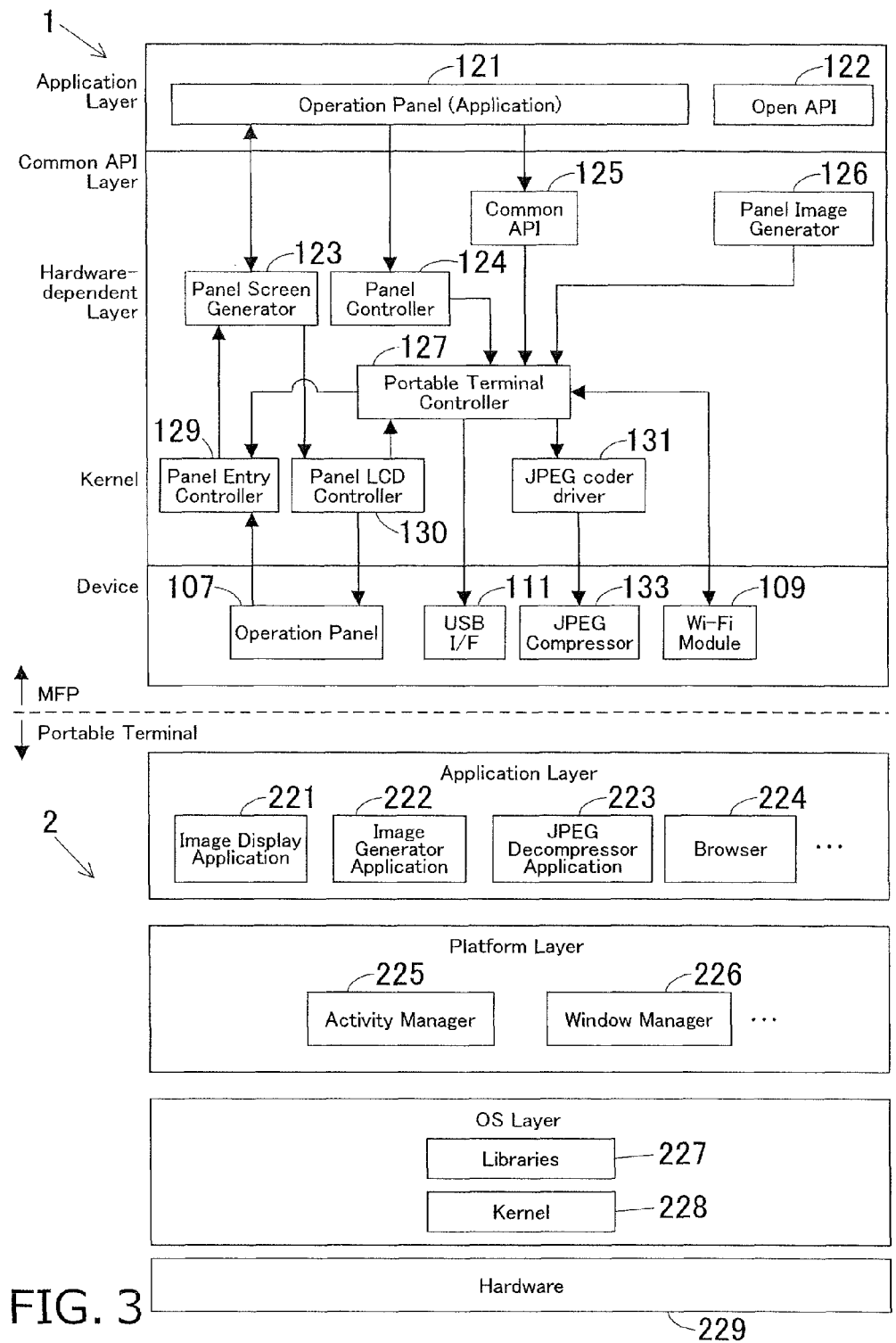
FIG. 3 is a block diagram illustrating a firmware configuration of the image processing apparatus and the portable terminal apparatus.

FIG. 3 is a block diagram illustrating a firmware configuration of the MFP 1 and the portable terminal 2.

The MFP 1 has: an operation panel (application) 121; an open application program interface (open API) 122; and the like in its application layer; a common application program interface (common API) 125; a panel image generator 126; and the like in its common API layer, and a panel screen generator 123; a panel controller 124; portable terminal controller 127; and the like in its hardware-dependent layer.

The MFP 1 also has: a panel entry controller 129; a panel LCD controller 130; a JPEG coder driver 131; and the like in its kernel, and an operation panel 107; an USB interface 111; a JPEG compressor 133; a Wi-Fi module 109; and the like in its devices.

The panel screen generator 123 generates screen data for reproducing an operation screen that is displayed on the operation panel 107, when a user starts the cooperation from the portable terminal 2.

The panel controller 124 controls communication of the operation panel 107. Further, the panel image generator 126 generates next screen data to be displayed on the portable terminal 2, based on operation information from the portable terminal 2. However, if a remote screen displayed on the portable terminal 2 is enlarged on the portable terminal 2 side when cooperation is enabled, and an operation indicated by the operation information notified from the portable terminal 2 is an operation of displaying a popup portion, the panel image generator 126 generates next screen data so that the popup portion is displayed in an image enlarged state in the display portion 204a of the portable terminal 2. In other words, if a part or the entirety of a popup portion is not displayed in an image enlarged state in the display portion 204a of the portable terminal 2, the position of the popup portion is adjusted, and furthermore, the size or shape of the popup portion is changed, as necessary.

The portable terminal controller 127 controls an interface for communicating with the portable terminal 2 and also controls others under the cooperation between the MFP 1 and the portable terminal 2.

The panel entry controller 129 performs control of input operations via the operation panel 107; the panel LCD controller 130 performs display control of the display portion 107b. The JPEG compressor 133 compresses into JPEG form files and screen data for reproducing an operation screen, which are received from the portable terminal controller 127 by way of the JPEG codec driver 131, and transmits the compressed files and data to the portable terminal 2 by way of the USB interface 111 and the Wi-Fi module 109.

The portable terminal 2 is composed of: an application layer including an image display application 221, an image generator application 222, a JPEG decompressor application 223, and various applications such as a browser; a platform layer including an activity manager 225, a window manager 226, and other managers; an OS layer including various libraries 227 and a kernel 228; and a hardware 229.

The JPEG decompressor application 223 decompresses the compressed data received from the MFP 1.

The image generator application 222 performs the editorial processing with screen data being displayed and stored in the memory 203, and displaying the editorial processed screen data on the display screen, when a user performs a gesture operation instructing enlargement/reduction of image data via the touch-panel.

The image display application 221 reproduces and displays an operation screen of the MFP 1 on the display portion 204a as a remote screen on the basis of screen data received from the MFP 1, after the screen data is decompressed by the JPEG decompressor application 223.

In this embodiment, the image display application 221, the image generator application 222, and the JPEG decompressor application 223 are configured such that they can achieve one of the functions of the cooperation application.

Hereinafter, how the MFP 1 facilitates the cooperation with the portable terminal 2.

Here, a user is trying to access the MFP 1 via the network from the portable terminal 2 in a wireless manner to perform remote operations under the cooperation with the MFP 1 and the portable terminal 2. The user will start the cooperation between the MFP 1 and the portable terminal 2 by activating a cooperation application installed on the portable terminal 2.

Figure 4:
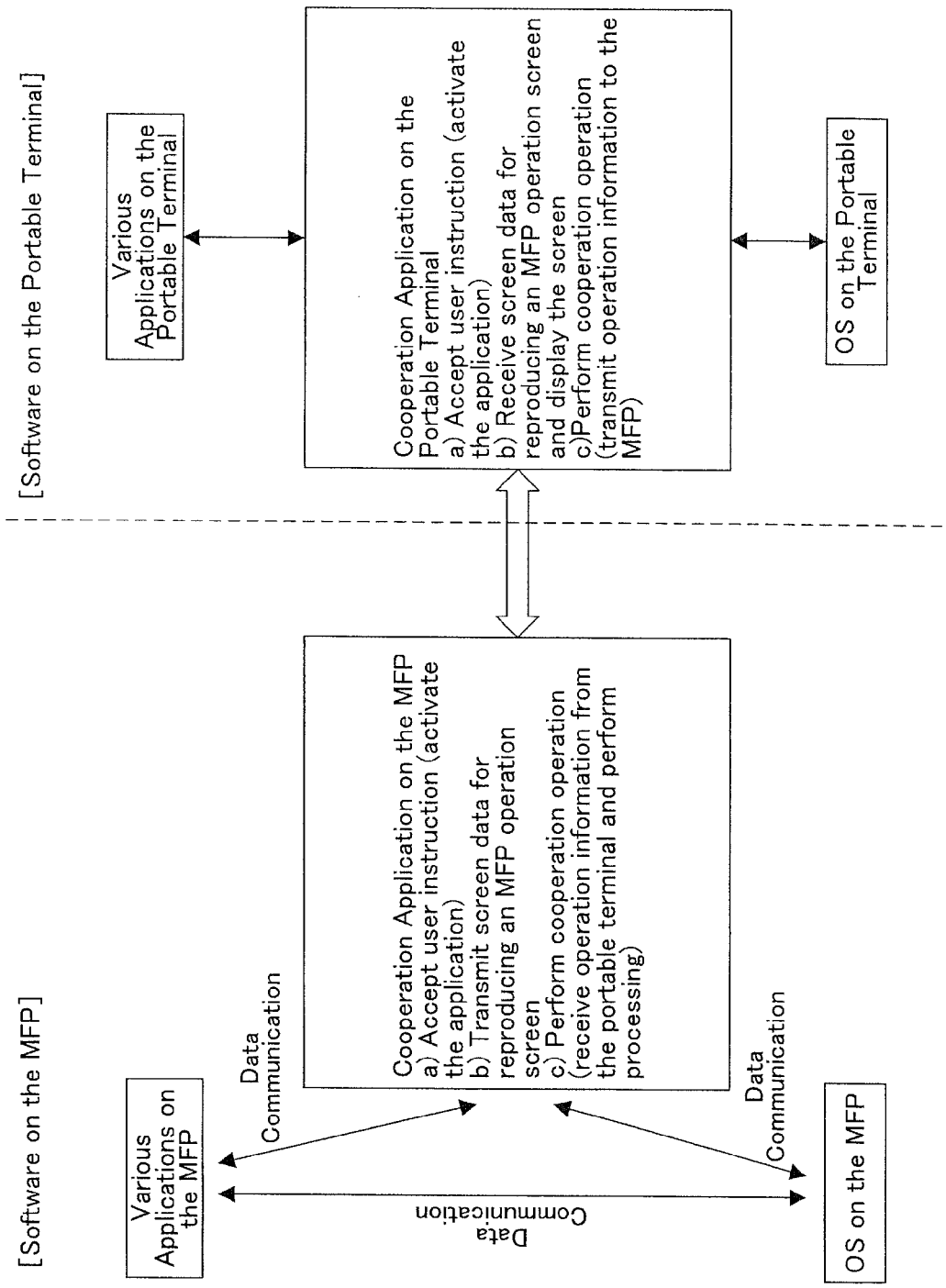
FIG. 4 illustrates the relationship among applications installed on the image processing apparatus and the portable terminal apparatus.

FIG. 4 illustrates the relationship among applications installed on the MFP 1 and the portable terminal 2; the applications on the MFP 1 are shown on the left side and the applications on the portable terminal 2 are shown on the right side.

With the cooperation application of the portable terminal 2, which is positioned between an operation system (OS) of the portable terminal 2 and application software that is general-purpose, the portable terminal 2 is allowed to transmit operation information of the user, exchange data with the MFP 1, and receive screen data from the MFP 1 when necessary. In other words, the cooperation application of the portable terminal 2 accepts user instructions on the portable terminal 2, for example, instructions for activating applications; receives screen data for reproducing an operation screen of the MPF 1; displays the operation screen; and performs any other operations for facilitating the cooperation with the MFP 1. The any other operations for facilitating the cooperation with the MFP 1 include transmitting operation information indicating the details of user operation performed via the operation portion 204b.

If the MFP 1 is allowed to obtain all necessary information anytime because its OS and its general-purpose application software are all designed or customized in-house, the cooperation software of the MFP 1 does not necessarily have to be positioned between the OS and the general-purpose application software. That is, the cooperation application of the MFP 1, which is completely independent of the OS and the general-purpose application software, may obtain all necessary information by communicating with the OS and the general-purpose application software. The cooperation application of the MFP 1 accepts user instructions on the MFP 1, for example, instructions for activating applications; transmits screen data for reproducing an operation screen of the MFP 1 (and preparing the screen data); and performs any other operations for facilitating the cooperation with the portable terminal 2. The any other operations for facilitating the cooperation with the portable terminal 2 includes: receiving operation information indicating the details of user operation; and performing image processing.

When the user performs a touch operation on the remote screen, which is the screen on the side of the MFP 1 and displayed on the portable terminal 2, it is determined whether the touch operation is a gesture operation instructing enlargement/reduction of screen data or a normal button operation. Then, if it is determined that the touch operation is the gesture operation instructing the enlargement/reduction of the screen data, an instructed region is enlarged/reduced and displayed in the display portion 204a.

On the one hand, if it is determined that the touch operation is the normal button operation, the portable terminal 2 transmits coordinate data of a touched position on the operation portion 204b to the MFP 1 as operation information.

The MFP 1 analyzes the received operation information consisting of the coordinate data, judges which button on the screen is pressed, and generates next screen data corresponding to the pressing of the button. Then, the MFP 1 either transmits the next screen data to the portable terminal 2 or performs job processing corresponding to the pressing of the button, and the like. The portable terminal 2 displays the received next screen data in the display portion 204b to update the screen.

In this manner, the MFP 1 can be remotely operated with the portable terminal 2.

Incidentally, in some cases, an operation performed by the user on the remote screen displayed on the portable terminal 2 may be an operation of displaying a popup portion composed of another window.

Figure 5A:
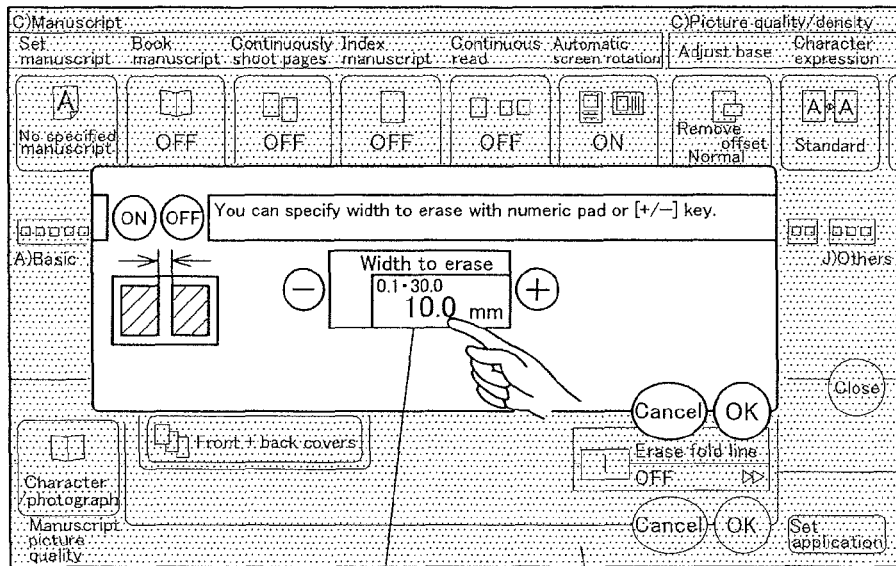
FIGS. 5A and 5B are views showing one example of a screen on which a popup portion is displayed.
Figure 5B:
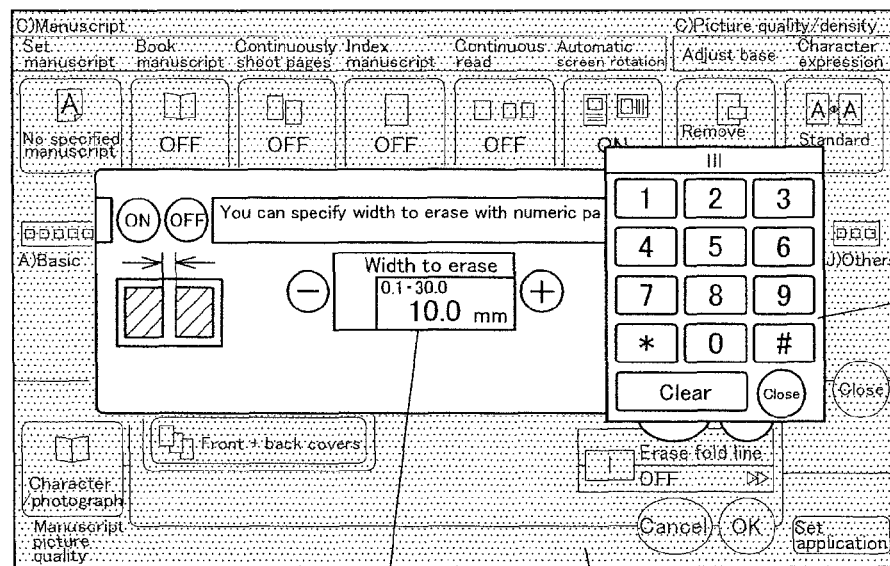

To effectively utilize a screen display area, the popup portion is displayed when setting of functions of the MFP 1 is required, for example, when a numeric value is inputted, and the like. FIGS. 5A and 5B are views showing a case in which the popup portion 400 is displayed in the display portion 107b of the MFP 1, for example, when a numeric value is inputted. Note that a scene in which the popup portion 400 is displayed is not limited.

As shown in FIG. 5A, the screen D1 having a numeric value input area 300 is displayed in the display portion 107b. When the user touches the numeric value input area 300, as shown in the screen D2 of FIG. 5B, input keys consisting of a soft numeric keypad is displayed as the popup portion 400. Note that the input keys may be a soft keyboard rather than the soft numeric keypad.

It has been set in advance that the popup portion 400 is arranged in a position in the display portion 107b of the MFP 1 which prevents the displayed numeric value input area 300 from being hidden and where the user can easily operate without shifting his/her glance frequently. In the embodiment, the popup portion 400 is arranged to the right of the numeric value input area 300, for example.

Using the input keys displayed in the popup portion 400, the user can input a numeric value in the numeric value input area 300.

Although FIGS. 5A and 5B show the case in which the popup portion 400 is displayed in the display portion 107b of the MFP 1, the same screen is displayed as a remote screen on the display portion 204a of the portable terminal 2 during a remote operation.

However, when the screen (screen of FIG. 5A) before the operation for displaying the popup portion 400 is enlarged and displayed on the side of the portable terminal 2, the popup portion 400 may not be displayed within the screen even if the user performs the operation for displaying the popup portion 400. This will be described in FIGS. 6A-C.

Figure 6A:
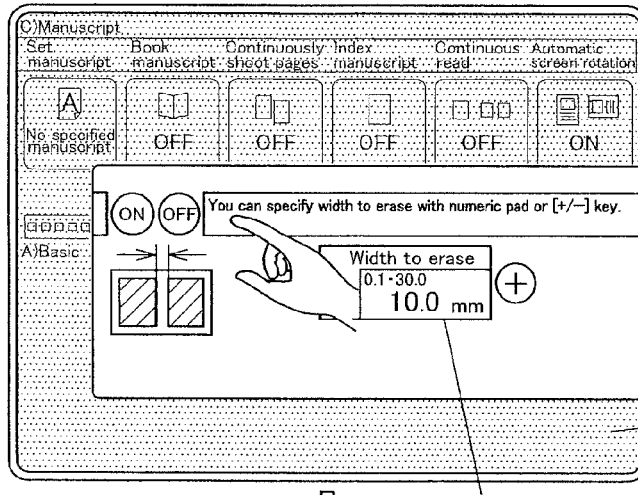
FIGS. 6A-C are explanatory views of a method for arranging a display position of the popup portion.

FIG. 6A shows the screen D3 in a state in which the image is enlarged by the user performing an image enlargement operation by a pinch operation. As a result of the enlargement, the remote screen is displayed with some part thereof missing in the display area of the display portion 204a, and a part of the area to the right of the numeric value input area 300 is out of the display area.

Figure 6B:
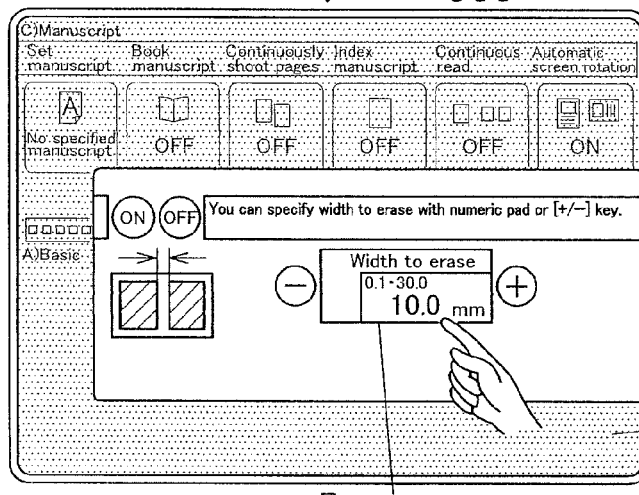

As shown in FIG. 6B, when the user touches the numeric value input area 300 on the enlarged screen, coordinate data of the touched position is transmitted as operation information to the MFP 1. Then, since the image is enlarged on the portable terminal 2, the portable terminal 2 transmits to the MFP 1 information including an enlargement factor and central coordinates as enlargement display information showing a current display state, together with the operation information.

The MFP 1 generates next screen data on which the popup portion 400 is displayed corresponding to the operation information. When the generated next screen data is enlarged, the part of the area to the right of the numeric value input area 300 goes out of the display area of the display portion 204a of the portable terminal 2. However, MFP 1 has set in advance that the popup portion 400 is arranged to the right of the numeric value input area 300, as shown in FIG. 5B. Thus, in this condition, as shown by the dashed X mark in FIG. 6C, the entire or some popup portion 400 is out of the display area of the display portion 204a of the portable terminal 2. Then, the user may neither be able to recognize the popup portion 400 nor perform a numeric value input operation.

Figure 6C:
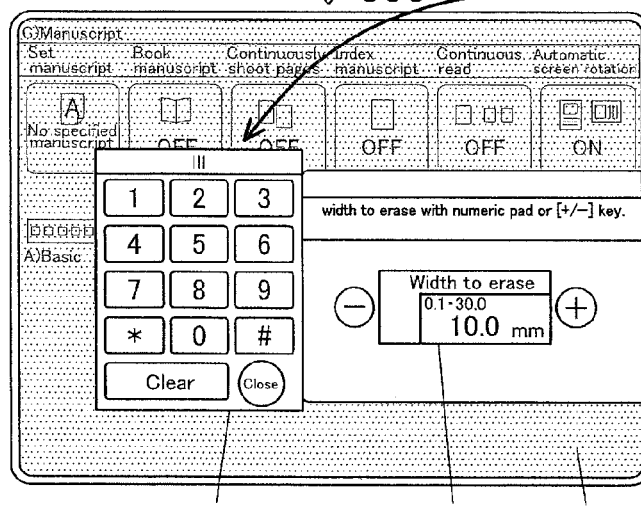

Hence, in the embodiment, next screen data is generated with the display position of the popup portion 400 adjusted and moved to the left of the numeric value input area 300, as shown by the screen D4 in FIG. 6C, so that the popup portion 400 after the enlargement is displayed in the display portion 204a of the portable terminal 2.

With this, the popup portion 400 can be displayed in the image enlarged state on the portable terminal 2, thus allowing the user to definitely recognize the popup portion 400 and input a numeric value.

To adjust the display position of the popup portion 400, a displayable area of the popup portion 400 is determined based on at least any of size of the popup portion 400, full screen size, a screen area which must not be hidden, and priority of a display area in the screen. Then, the popup portion 400 is arranged in the determined displayable area.

The size of the popup portion 400, the full screen size, the screen area which must not be hidden, and the priority of the display area in the screen are set in advance and stored in the storage portion 106.

One example of a method for determining a displayable area of the popup portion 400 will be described with FIG. 7.

Figure 7:
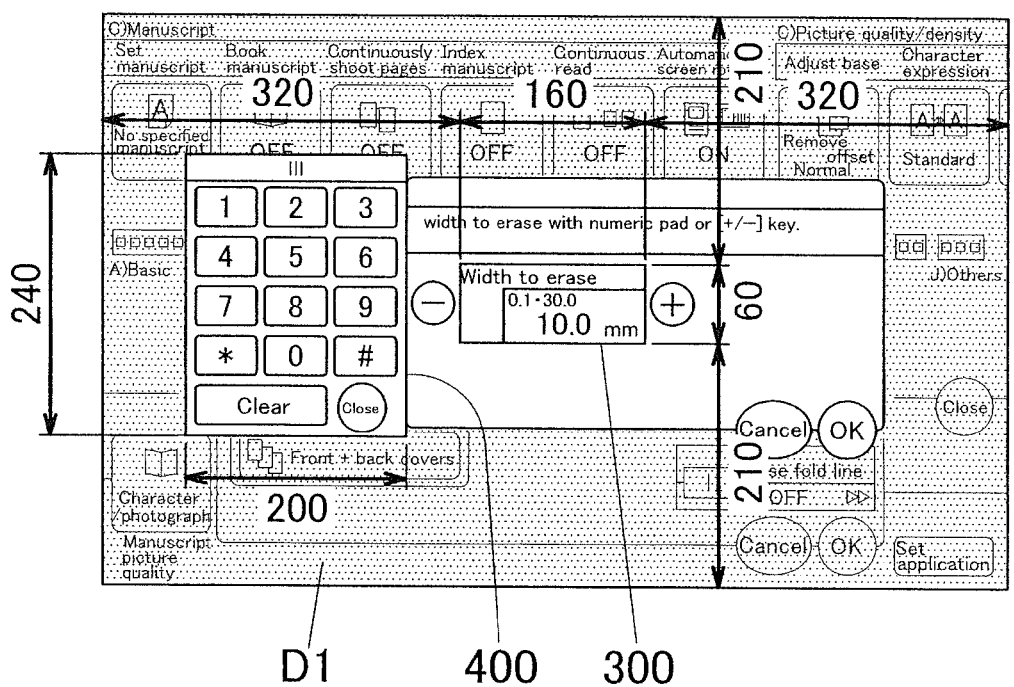
FIG. 7 is an explanatory view of a method for determining a displayable area of the popup portion.

In FIG. 7, the full screen size is 800 (width)×480 (height) dots, the size of the popup portion 400 is 200 (width)×240 (height) dots, the side of the numeric value input area is 160 (width)×60 (height) dots, and the center of the numeric value input area is positioned at the center of the screen.

If the screen is enlarged to 1.33 times on the side of the portable terminal 2, with the left top of the screen as the coordinate origin (0,0), the area of 600 (width)×360 (height) dots of the original image is enlarged and displayed in the display portion 204a, and the central coordinates of the screen are (x,y)=(300, 180).

Now, if the numeric value input area 300 is hidden by the popup portion 400, the user cannot check the numeric value he/she inputted. Thus, it is not preferable to hide the numeric value input area 300 with the popup portion 400. In addition, since there is only a displayable area of 120 dots (width) to the right of the numeric value input area 300 after the enlargement, the popup portion 400 cannot be displayed.

In contrast, since there is a displayable area of 320 dots (width) to the left of the numeric value input area 300, as with prior to the enlargement, the popup portion 400 can be displayed. Thus, the popup portion 400 is arranged to the left of the numeric value input area 300. In addition, priority of the display area of the popup portion 400 is considered. Now, since there are displayable areas in the upper and lower directions, the popup portion 400 can be shifted up or down and arranged. However, in order to relieve the user of shifting his/her glance, the center line of the numeric value input area 300 is made identical to that of the popup portion 400.

In addition, in the example of FIG. 7, the displayable area of the popup portion 400 is present to the left of the numeric value input area 300. However, if size of the area to the left of the numeric value input area 300 is small, for example, if it is 160 dots (width), the popup portion 400 may be reduced in size to, for example, 150 (width)×180 (height) dots, and arranged. Alternatively, if the area is small in a vertical direction, and the like, shape of the popup portion 400 may be changed to 150 (width)×150 (height) dots, and the like.

In addition, if the popup portion 400 cannot be displayed in the image enlarged state in the display portion 204a of the portable terminal 2 even after the display position of the popup portion 400 is adjusted, the MFP 1 may notify the portable terminal 2 of a change of the enlargement factor along with transmission of next screen data. The MFP 1 determines the enlargement factor to change. Upon receipt of the notice, the portable terminal 2 can definitely display the popup portion 400 by enlarging the next screen data with the notified enlargement factor.

In addition, if the popup portion 400 cannot be displayed in the image enlarged state in the display portion 204a of the portable terminal 2 even after the display position of the popup portion 400 is adjusted, the MFP 1 may notify the portable terminal 2 of a request for screen scrolling. The MFP 1 determines amount of scrolling. Upon receipt of the notice, the portable terminal 2 can definitely display the popup portion 400 by scrolling the screen after the image enlargement only by the notified amount of scrolling.

If any image which must not be hidden is present at the display position after adjustment of the popup portion 400, it is desirable to transparently display the popup portion 400, thereby configuring so that both a background image which must not be hidden and the popup portion 400 can be visually recognized.

In addition, since it is believed that the user enlarges an image on the portable terminal 2 to make the image easily viewable, the user may facilitate adjustment by changing size of characters in the popup portion 400 to that of the smallest characters around the screen central area and then reducing size of the popup portion 400 as small as possible to increase the degree of freedom in the adjustment of the popup display position. After the image enlargement, the characters in the popup portion 400 whose size is changed will be enlarged and displayed to the size similar to that of the characters around the screen central area, and thus have easily viewable size.

Note that change of the size, change of the shape, change of the characters and the like of the popup portion 400 may be arbitrarily combined and performed.

Next, display processing operations of a remote screen to be performed with MFP 1 and a portable terminal 2 in a remote mode will be described with reference to the flow chart of FIG. 8. Note that the operations are performed by a CPU 101 of the MFP 1 and a CPU 201 of the portable terminal 2 operation according to respective operation programs.

Based on a request for screen acquisition from the portable terminal 2, the MFP 1 creates display screen data in step S101 and transfers it to the portable terminal 2 in step S102.

The screen data to be transferred then is created based on screen data to be displayed in a display portion 107b as an operation screen in an image forming apparatus. Basically, a file format of image data to be created is not a unique file format corresponding to an OS or application of the portable terminal 2, but a general-purpose file format such as JPEG, TIFF and the like of image data, directly converted from screen data for operations to be displayed in an operation portion of the image forming apparatus.

Figure 8:
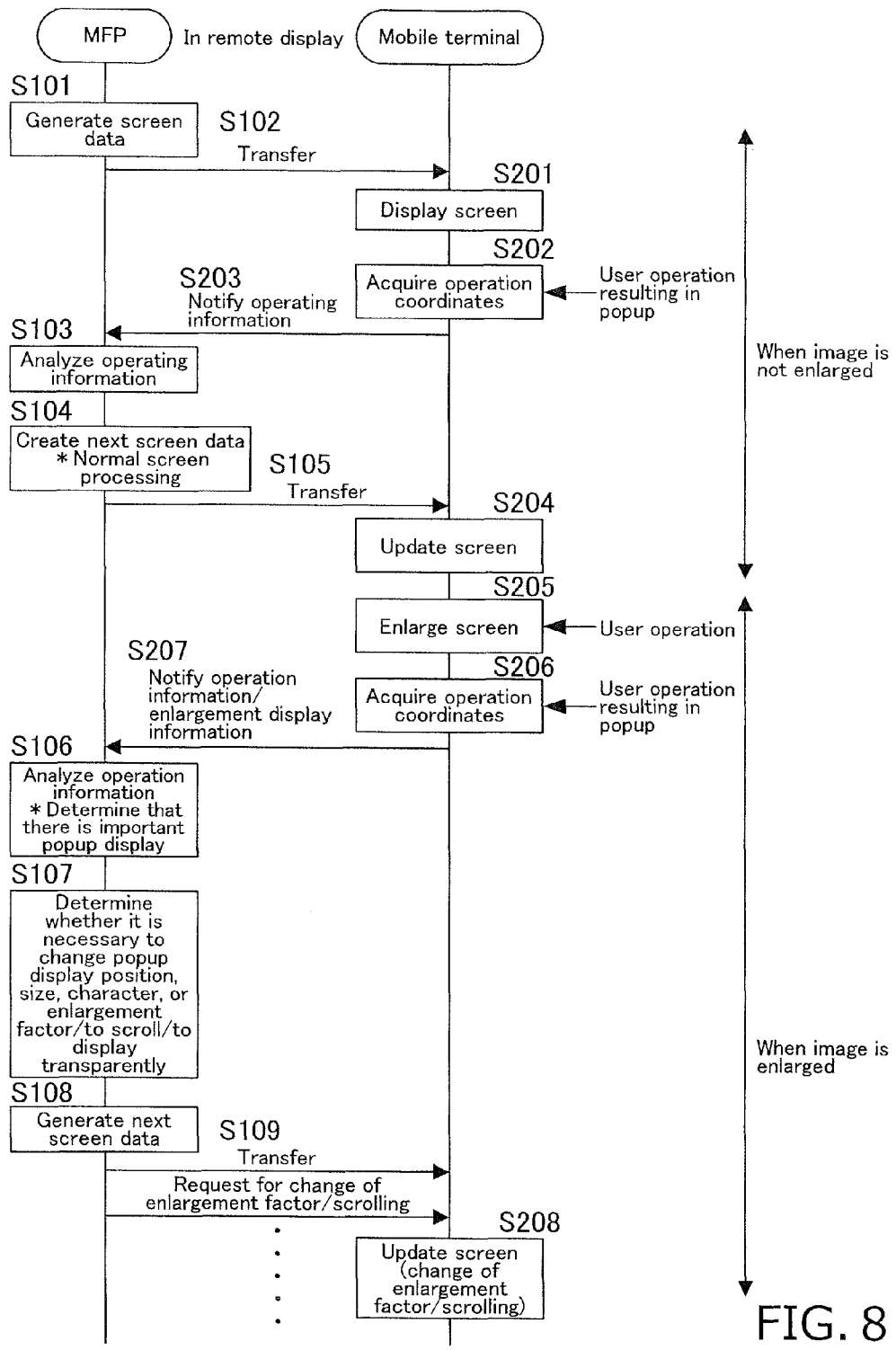
FIG. 8 is a flowchart showing the display processing operation performed by the image processing apparatus and the portable terminal apparatus.

Note that prior to the flow chart of FIG. 8 or sequentially, the MFP 1 receives from the portable terminal 2 "information indicating a display state of the remote screen" being displayed in the display portion 204a of the portable terminal 2.

The portable terminal 2 displays the remote screen based on the received screen data in the display portion 204a in step S201.

When the user performs an operation of displaying the popup portion 400, the portable terminal 2 acquires coordinate data of an operation position on the touch panel in the operation portion 204b in step S202, and notifies the MFP 1 of the coordinate data as operation information in step S203.

When the MFP 1 receives the operation information, it analyzes the operation information in step S103, follows normal processing, and generates next screen data having the popup portion 400 corresponding to the operation. Then, the MFP 1 transfers the generated next screen data to the portable terminal 2 in step S105, and the portable terminal 2 updates the screen in step S204.

What has been described so far is the processing when the operation of displaying the popup portion 400 is performed with no image enlargement operation performed on the remote screen in the portable terminal 2, and is normal screen updating processing.

Next, when the user performs the image enlargement operation on the remote screen, the portable terminal 2 enlarges the image in step S205.

After the enlargement, if the user performs the operation of displaying the popup portion 400 on the remote screen, the portable terminal 2 acquires coordinate data of the operation position on the touch panel in the operation portion 204b in step S206, and notifies the MFP 1 of the operation information consisting of the coordinate data and enlargement display information including an image enlargement factor and central coordinates in step S207.

In step S106, the MFP 1 analyzes the operation information to determine whether or not it is the operation of displaying the popup portion 400 which needs to be visually recognized by the user. Furthermore, the MFP 1 recognizes from the enlargement display information that it is the operation in the image enlarged state. The popup portion 400 which needs to be visually recognized by the user is the popup portion 400 which the user certainly uses (touches) in a next operation such as input of a numeric value and the like. For the popup portion 400 which does not need to be visually recognized by the user, the normal processing in step S104 and step S204 described above is performed, without adjustment of the display position of the popup portion 400 being performed. It is set in advance whether or not the popup portion 400 needs to be visually recognized by the user.

For the popup portion 400 which needs to be visually recognized by the user, in step S107, the display position of the popup portion 400 in the next screen data is adjusted so that the popup portion 400 is also displayed in the display portion 204a when the next screen is enlarged and displayed in the portable terminal 2. Furthermore, it is determined whether or not there is any need to change size or shape of the popup portion 400, change character size, or transparently display the popup portion 400. It is also determined whether or not a request for change of an enlargement factor or for screen scrolling is needed if the popup portion 400 cannot be displayed in the image enlarged state in the portable terminal 2 even after the display position of the popup portion 400 is adjusted.

Then, after reflecting results of the adjustment or of the determination of the display position of the popup portion 400 described above and generating next screen data in step S108, the MFP 1 transmits the next screen data to the portable terminal 2 in step S109. If the change of the enlargement factor or the screen scrolling is needed, the MFP 1 also makes a request therefor.

When the portable terminal 2 receives the next screen data, it enlarges the image of the next screen data by the enlargement factor identical to the previous screen, displays it in the display portion 204a, and updates the screen in step S208. If the MFP 1 makes the request for the change of the enlargement factor or the screen scrolling, the portable terminal 2 enlarges the screen by the specified enlargement factor or performs the screen scrolling by the specified amount, thereby definitely displaying the popup portion 400 in the display portion 204a.

In this manner, in the embodiment, since the MFP 1 adjusts the display position of the popup portion 400 so that the popup portion 400 is displayed in the image enlarged state in the display portion 204*a* of the portable terminal 2, the popup portion 400 can be definitely displayed in the display area of the next screen to be enlarged and displayed in the display portion 204*a* of the portable terminal 2. Therefore, the user no longer has to perform the operation of scrolling the screen of the portable terminal 2 and the like to display the popup portion 400 being hidden in the area out of the display area, and can definitely recognize that the popup portion 400 is displayed, which thereby can improve operability.

The present invention, whose one embodiment has been described in details herein, can solve the unsolved problems by its following modes.

[1] A display processing apparatus comprising:
a connection portion connectable to a portable terminal apparatus;
a transmission portion for transmitting screen data for operations of the display processing apparatus to the portable terminal apparatus connected by the connection portion;
a receiving portion for receiving operation information indicating an operation performed by a user on a remote screen from the portable terminal apparatus displaying in a display portion the remote screen of the display processing apparatus based on the screen data and for receiving from the portable terminal apparatus the operation information and enlargement display information indicating an enlarged display state when a user operation is performed on the remote screen displayed with some part thereof missing in a state in which the screen is enlarged;
a determination portion for determining whether the operation indicated by the operation information received by the receiving portion is an operation of displaying a popup portion; and
a screen generating portion for not only generating next screen data corresponding to the operation information received by the receiving portion, but also adjusting a display position of the popup portion to generate next screen data, so that the popup portion is displayed in the display portion of the portable terminal apparatus in an image enlarged state based on the enlargement display information if the receiving portion receives the operation information and the enlargement display information and if the determination portion determines that the operation indicated by the operation information is the operation of displaying the popup portion, and
wherein the transmission portion transmits the next screen data generated by the screen generating portion to the portable terminal apparatus.

[2] The display processing apparatus according to the foregoing mode [1] wherein the screen generating portion determines a displayable area of the popup portion based on at least any of size of the popup portion, full screen size, a screen area which must not be hidden, and priority of a display area in the screen, and arranges the popup portion in the determined displayable area.

[3] The display processing apparatus according to the foregoing mode [1] or [2] wherein the screen generating portion changes the size of the popup portion if the popup portion cannot be displayed in the image enlarged state in the display portion of the portable terminal apparatus even after the screen generating portion adjusts the display position of the popup portion.

[4] The display processing apparatus according to any one of the foregoing mode [1] to [3] wherein the screen generating portion changes shape of the popup portion if the popup portion cannot be displayed in the image enlarged state in the display portion of the portable terminal apparatus even after the screen generating portion adjusts the display position of the popup portion.

[5] The display processing apparatus according to any one of the foregoing mode [1] to [4] wherein the screen generating portion notifies the portable terminal apparatus of change of an enlargement factor if the popup portion cannot be displayed in the image enlarged state in the display portion of the portable terminal apparatus even after the screen generating portion adjusts the display position of the popup portion.

[6] The display processing apparatus according to any one of the foregoing mode [1] to [4] wherein the screen generating portion requests the portable terminal apparatus to scroll the screen if the popup portion cannot be displayed in the image enlarged state in the display portion of the portable terminal apparatus even after the screen generating portion adjusts the display position of the popup portion.

[7] The display processing apparatus according to any one of the foregoing mode [1] to [3] wherein the screen generating portion transparently displays the popup portion if an image which must not be hidden is present at the display position of the popup portion.

[8] The display processing apparatus according to the foregoing mode [3] wherein the screen generating portion changes size of characters in the popup portion.

[9] The display processing apparatus according to any one of the foregoing mode [1] to [8] wherein input keys are displayed in the popup portion.

[10] An image forming apparatus comprising the display processing apparatus according to any one of the foregoing mode [1] to [9].

[11] The image forming apparatus according to the foregoing mode [10] wherein a screen for operations of the image forming apparatus is a screen for configuring settings for the image forming apparatus and the popup portion is used to input a setting.

[12] A display processing system of a remote screen comprising a display processing apparatus and a portable terminal apparatus which can be mutually connected, wherein
the display processing apparatus comprises:
a connection portion connectable to the portable terminal apparatus;
a transmission portion for transmitting screen data for operations of the display processing apparatus to the portable terminal apparatus connected by the connection portion;
a receiving portion for receiving operation information indicating an operation performed by a user on a remote screen from the portable terminal apparatus displaying in a display portion the remote screen of the display processing apparatus based on the screen data and for receiving from the portable terminal apparatus the operation information and enlargement display information indicating an enlarged display state when a user operation is performed on the remote screen displayed with some part thereof missing in a state in which the screen is enlarged;
a determination portion for determining whether the operation indicated by the operation information received by the receiving portion is an operation of displaying a popup portion; and
a screen generating portion for not only generating next screen data corresponding to the operation information received by the receiving portion, but also adjusting a display position of the popup portion to generate next screen data, so that the popup portion is displayed in the display portion of the portable terminal apparatus in an image enlarged state based on enlargement display information if the receiving portion receives the operation information and the enlargement display information and if the determination portion determines that the operation indicated by the operation information is the operation of displaying the popup portion, and wherein the transmission portion transmits the next screen data generated by the screen generating portion to the portable terminal apparatus, wherein the portable terminal apparatus comprises:

a receiving portion for receiving screen data transmitted from the display processing apparatus;

a display portion for displaying the remote screen of the display processing apparatus based on the screen data; and a transmission portion for transmitting operation information to the display processing apparatus when the user performs an operation on the remote screen, and for transmitting to the display processing apparatus the operation information and enlargement display information indicating an enlarged display state when a user operation is performed on the remote screen in a state in which the screen is enlarged.

[13] A display processing method of a remote screen to be performed in a display processing apparatus connected to a portable terminal apparatus by a connection portion, the display processing method of the remote screen comprising:

transmitting screen data for operations of the display processing apparatus to the portable terminal apparatus;

receiving operation information indicating an operation performed by a user on the remote screen from the portable terminal apparatus displaying in a display portion the remote screen of the display processing apparatus based on the screen data and receiving from the portable terminal apparatus the operation information and enlargement display information indicating an enlarged display state when a user operation is performed on the remote screen displayed with some part thereof missing in a state in which the screen is enlarged;

determining whether the operation indicated by the operation information received in the receiving is an operation of displaying a popup portion; and generating next screen data corresponding to the operation information received in the receiving, and adjusting a display position of the popup portion to generate next screen data, so that the popup portion is displayed in the display portion of the portable terminal apparatus in an image enlarged state based on the enlargement display information if the operation information and the enlargement display information are received in the receiving and if it is determined in the determining that the operation indicated by the operation information is the operation of displaying the popup portion, and wherein in the transmitting, the next screen data generated in the generating is transmitted to the portable terminal apparatus.

[14] A display processing method of a remote screen to be performed in a display processing system of the remote screen comprising a display processing apparatus and a portable terminal apparatus which can be mutually connected, wherein the display processing apparatus performs:

transmitting screen data for operations of the display processing apparatus to the portable terminal apparatus;

receiving operation information indicating an operation performed by a user on the remote screen from the portable terminal apparatus displaying in a display portion the remote screen of the display processing apparatus based on the screen data and receiving from the portable terminal apparatus the operation information and enlargement display information indicating an enlarged display state when a user operation is performed on the remote screen displayed with some part thereof missing in a state in which the screen is enlarged;

determining whether the operation indicated by the operation information received in the receiving is an operation of displaying a popup portion; and generating next screen data corresponding to the operation information received in the receiving, and adjusting a display position of the popup portion to generate next screen data, so that the popup portion is displayed in the display portion of the portable terminal apparatus in an image enlarged state based on the enlargement display information if the operation information and the enlargement display information are received in the receiving and if it is determined in the determining that the operation indicated by the operation information is the operation of displaying the popup portion, and wherein in the transmitting, the next screen data generated in the generating is transmitted to the portable terminal apparatus, and the portable terminal apparatus performs:

receiving screen data transmitted from the display processing apparatus;

displaying the remote screen of the display processing apparatus based on the screen data; and transmitting operation information to the display processing apparatus when the user performs an operation on the remote screen, and transmitting to the display processing apparatus the operation information and enlargement display information indicating an enlarged display state when a user operation is performed on the remote screen in a state in which the screen is enlarged.

According to the aforementioned mode [1] of the invention, when the user performs an operation of enlarging an image on the remote screen of the display processing apparatus displayed in the display portion of the portable terminal apparatus, the portable terminal apparatus enlarges and displays the image portion of the remote screen operated by the user. When a user operation is performed on the remote screen in this state, the display processing apparatus receives from the portable terminal apparatus operation information and enlargement display information indicating an enlarged display state. The display processing apparatus determines whether the operation indicated by the received operation information is an operation of displaying a popup portion, and generates next screen data including a popup portion when the operation is determined to be an operation of displaying a popup portion.

In performing the above operation, the display position of the popup portion is adjusted so that the popup portion is displayed in the image enlarged state in the display portion of the portable terminal apparatus. Therefore, the popup portion can be definitely displayed in the display area of a next screen to be displayed in the display portion of the portable terminal apparatus. Thus, the user does not have to scroll the screen of the portable terminal apparatus so as to locate the popup portion which has gone out of the screen within the screen, and can definitely visually recognize that the popup portion is displayed.

According to the aforementioned mode [2] of the invention, a displayable area of the popup portion is determined based on at least any of size of the popup portion, full screen size, a screen area which must not be hidden, and priority of a display area in the screen, and the popup portion is arranged in the determined displayable area. Therefore, the popup portion can be definitely displayed in the display area of a next screen to be displayed in the display portion of the portable terminal apparatus.

According to the aforementioned mode [3] of the invention, the popup portion can be definitely displayed in the display portion of the portable terminal apparatus by changing the size of the popup portion if the popup portion cannot be displayed in the image enlarged state in the display portion of the portable terminal apparatus even after the display position of the popup portion is adjusted.

According to the aforementioned mode [4] of the invention, the popup portion can be definitely displayed in the display portion of the portable terminal apparatus by changing the shape of the popup portion if the popup portion cannot be displayed in the image enlarged state in the display portion of the portable terminal apparatus even after the display position of the popup portion is adjusted.

According to the aforementioned mode [5] of the invention, the enlargement factor is changed on the side of the portable terminal apparatus by the request for changing the enlargement factor if the popup portion cannot be displayed in the image enlarged state in the display portion of the portable terminal apparatus even after the display position of the popup portion is adjusted. Therefore, the popup portion can be definitely displayed in the display portion of the portable terminal apparatus.

According to the aforementioned mode [6] of the invention, scrolling of a screen is requested to the portable terminal apparatus even after the display position of the popup portion is adjusted if the popup portion cannot be displayed in the display portion of the portable terminal apparatus. Therefore, the portable terminal apparatus can definitely display the popup portion in the display portion by scrolling the screen after image enlargement.

According to the aforementioned mode [7] of the invention, if an image which must not be hidden is present at the display position of the popup portion, the popup portion is transparently displayed. Therefore, it is possible to prevent hiding of an image which must not be hidden by the popup portion.

According to the aforementioned mode [8] of the invention, the degree of freedom of size change of the popup portion increases by changing the size of characters in the popup portion.

According to the aforementioned mode [9] of the invention, input keys such as a soft numeric keypad or a soft keyboard are displayed in the popup portion. Therefore, the user can input a numeric value and the like with use of the input keys.

According to the aforementioned mode [10] of the invention, there is provided an image forming apparatus configured such that if the user performs an operation of displaying a popup portion in a state that an image of a remote screen displayed in the display portion of the portable terminal apparatus is enlarged, next screen data of definitely displaying the popup portion in the image enlarged state in the display area of the portable terminal apparatus is generated, so that the next screen data can be transmitted to the portable terminal apparatus.

According to the aforementioned mode [11] of the invention, the user can perform settings for the image forming apparatus by the operation screen displayed on the portable terminal apparatus and the popup portion.

According to the aforementioned mode [12] of the invention, there is provided a system configured such that if the user performs an operation of displaying a popup portion in a state that a remote screen displayed in the display portion of the portable terminal apparatus is enlarged, next screen data of displaying the popup portion in the image enlarged state in the display area of the portable terminal apparatus is generated, so that the next screen data can be transmitted to the portable terminal apparatus.

According to the aforementioned mode [13] and [14] of the invention, if the user performs an operation of displaying a popup portion in a state that a remote screen displayed in the display portion of the portable terminal apparatus is enlarged, the display processing apparatus generates next screen data of displaying the popup portion in the image enlarged state in the display area of the portable terminal apparatus, so that the next screen data can be transmitted to the portable terminal apparatus. Therefore, the user can definitely visually recognize the popup portion in a screen displayed on the portable terminal apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A display processing apparatus comprising:
a connection portion that connects to a portable terminal apparatus comprising a display portion;
a transmission portion that transmits, to the portable terminal apparatus, screen data for operations of the display processing apparatus, wherein the portable terminal apparatus displays, on the display portion, a remote screen of the display processing apparatus based on the screen data;
a receiving portion that receives from the portable terminal apparatus:
operation information indicating an operation performed by a user on the remote screen, and
enlargement display information indicating an enlarged display state in which a user operation is performed on the remote screen that has been enlarged such that a part of the remote screen is not displayed;
a determination portion that determines whether the operation indicated by the operation information is an operation of displaying a popup portion; and
a screen generating portion that:
generates next screen data corresponding to the operation information, and
when the receiving portion receives the operation information and the enlargement display information and the determination portion determines that the operation information has indicated the operation of displaying the popup portion, adjusts a display position of the popup portion so that the popup portion is displayed in the display portion during the enlarged display state based on the enlargement display information,
wherein the transmission portion transmits the next screen data to the portable terminal apparatus.

2. The display processing apparatus according to claim 1 wherein the screen generating portion determines a displayable area of the popup portion based on at least any of size of the popup portion, full screen size, a screen area which must not be hidden, and priority of a display area in the screen, and arranges the popup portion in the determined displayable area.

3. The display processing apparatus according to claim 1 wherein the screen generating portion changes the size of the popup portion if the popup portion cannot be displayed in the image enlarged state in the display portion even after the screen generating portion adjusts the display position of the popup portion.

4. The display processing apparatus according to claim 3 wherein the screen generating portion changes size of characters in the popup portion.

5. The display processing apparatus according to claim 1 wherein the screen generating portion changes shape of the popup portion if the popup portion cannot be displayed in the image enlarged state in the display portion even after the screen generating portion adjusts the display position of the popup portion.

6. The display processing apparatus according to claim 1 wherein the screen generating portion notifies the portable terminal apparatus of change of an enlargement factor if the popup portion cannot be displayed in the image enlarged state in the display portion even after the screen generating portion adjusts the display position of the popup portion.

7. The display processing apparatus according to claim 1 wherein the screen generating portion requests the portable terminal apparatus to scroll the screen if the popup portion cannot be displayed in the image enlarged state in the display portion even after the screen generating portion adjusts the display position of the popup portion.

8. The display processing apparatus according to claim 1 wherein the screen generating portion transparently displays the popup portion if an image which must not be hidden is present at the display position of the popup portion.

9. The display processing apparatus according to claim 1 wherein input keys are displayed in the popup portion.

10. An image forming apparatus comprising the display processing apparatus according to claim 1.

11. The image forming apparatus according to claim 10 wherein a screen for operations of the image forming apparatus is a screen for configuring settings for the image forming apparatus and the popup portion is used to input a setting.

12. The display processing apparatus according to claim 1, wherein the screen generating portion adjusts the display position of the popup portion to generate the next screen data, so that the popup portion is displayed in the display portion in the enlarged display state.

13. The display processing apparatus according to claim 1, wherein the screen generating portion adjusts the display position of the popup portion to generate the next screen data, so that the popup portion is displayed in the display portion while a set value input area is also displayed in the display portion, the set value input area to accept a set value, the set value being input by the user operating the popup portion.

14. A display processing system comprising a display processing apparatus and a portable terminal apparatus that connects to the display processing apparatus, wherein
the portable terminal apparatus comprises:
a receiving portion that receives screen data transmitted from the display processing apparatus;
a display portion that displays a remote screen of the display processing apparatus based on the screen data; and
a transmission portion that transmits to the display processing apparatus:
operation information indicating an operation performed by a user on the remote screen, and
enlargement display information indicating an enlarged display state in which a user operation is performed on the remote screen that has been enlarged such that a part of the remote screen is not displayed,
the display processing apparatus comprises:
a transmission portion that transmits the screen data for operations of the display processing apparatus to the portable terminal apparatus;
a receiving portion that receives the operation information and the enlargement display information from the portable terminal apparatus:
a determination portion that determines whether the operation indicated by the operation information is an operation of displaying a popup portion; and
a screen generating portion that:
generates next screen data corresponding to the operation information, and
when the receiving portion receives the operation information and the enlargement display information and the determination portion determines that the operation information has indicated the operation of displaying the popup portion, adjusts a display position of the popup portion so that the popup portion is displayed in the display portion during the enlarged display state based on enlargement display information,
wherein the transmission portion transmits the next screen data generated by the screen generating portion to the portable terminal apparatus.

15. The display processing system according to claim 14, wherein the screen generating portion adjusts the display position of the popup portion to generate the next screen data, so that the popup portion is displayed in the display portion in the enlarged display state.

16. The display processing system according to claim 14, wherein the screen generating portion adjusts the display position of the popup portion to generate the next screen data, so that the popup portion is displayed in the display portion while a set value input area is also displayed in the display portion, the set value input area to accept a set value, the set value being input by the user operating the popup portion.

17. A display processing method performed by a display processing apparatus connected to a portable terminal apparatus comprising a display portion, the display processing method comprising:
    transmitting screen data for operations of the display processing apparatus to the portable terminal apparatus,
        wherein the portable terminal apparatus displays, on the display portion, a remote screen of the display processing apparatus based on the screen data;
    receiving from the portable terminal apparatus:
        operation information indicating an operation performed by a user on the remote screen, and
        enlargement display information indicating an enlarged display state in which a user operation is performed on the remote screen that has been enlarged such that a part of the remote screen is not displayed;
    determining whether the operation indicated by the operation information is an operation of displaying a popup portion;
    generating next screen data corresponding to the operation information received; and
    when the receiving portion receives the operation information and the enlargement display information and the determination portion determines that the operation information has indicated the operation of displaying the popup portion, adjusting a display position of the popup portion so that the popup portion is displayed in the display portion during the enlarged display state based on the enlargement display information,
        wherein in the transmitting, the next screen data generated in the generating is transmitted to the portable terminal apparatus.

18. The display processing method according to claim 17, wherein the screen generating portion adjusts the display position of the popup portion to generate the next screen data, so that the popup portion is displayed in the display portion in the enlarged display state.

19. The display processing method according to claim 17, wherein the screen generating portion adjusts the display position of the popup portion to generate the next screen data, so that the popup portion is displayed in the display portion while a set value input area is also displayed in the display portion, the set value input area to accept a set value, the set value being input by the user operating the popup portion.

20. A non-transitory computer-readable recording medium having a program stored thereon to make a computer of a display processing apparatus execute each of the steps as recited in claim 17, the display apparatus being connected to a portable terminal apparatus via a connection portion.

21. A display processing method performed by a display processing system comprising a display processing apparatus and a portable terminal apparatus that connects to the display processing apparatus, the display processing method comprising:
    receiving, with the portable terminal apparatus, screen data transmitted from the display processing apparatus;
    displaying, with the portable terminal apparatus, a remote screen of the display processing apparatus based on the screen data;
    transmitting to the display processing apparatus, with the portable terminal apparatus:
        operation information indicating an operation performed by a user on the remote screen, and
        enlargement display information indicating an enlarged display state in which a user operation is performed on the remote screen that has been enlarged such that a part of the remote screen is not displayed,
    transmitting, with the display processing apparatus, the screen data for operations of the display processing apparatus to the portable terminal apparatus;
    receiving, with the display processing apparatus, the operation information and the enlargement display information from the portable terminal apparatus;
    determining, with the display processing apparatus, whether the operation indicated by the operation information is an operation of displaying a popup portion;
    generating, with the display processing apparatus, next screen data corresponding to the operation information received; and
    when the receiving receives the operation information and the enlargement display information and the determining determines that the operation information has indicated the operation of displaying the popup portion, adjusting, with the display processing apparatus, a display position of the popup portion so that the popup portion is displayed in the display portion during the enlarged display state based on the enlargement display information,
    wherein in the transmitting, the next screen data generated in the generating is transmitted to the portable terminal apparatus.

22. The display processing method according to claim 21, wherein the screen generating portion adjusts the display position of the popup portion to generate the next screen data, so that the popup portion is displayed in the display portion in the enlarged display state.

23. The display processing method according to claim 21, wherein the screen generating portion adjusts the display position of the popup portion to generate the next screen data, so that the popup portion is displayed in the display portion while a set value input area is also displayed in the display portion, the set value input area to accept a set value, the set value being input by the user operating the popup portion.

* * * * *